United States Patent Office 3,487,659
Patented Jan. 6, 1970

3,487,659
PROCESS AND APPARATUS FOR INCREASING
THE THICKNESS OF FLOAT GLASS
Kunihiko Ito and Yukiya Fujimoto, Maizuri-shi, Japan,
assignors to Nippon Sheet Glass Co., Ltd., Osaka, Japan
Filed July 10, 1967, Ser. No. 652,046
Claims priority, application Japan, July 18, 1966,
41/46,927
Int. Cl. C03b 18/02
U.S. Cl. 65—25                                    14 Claims

ABSTRACT OF THE DISCLOSURE

A distortionless flat glass having a uniform thickness is prepared by confining a glass ribbon on a molten metal bath between two controlling means which are at least partially within the bath. Each of these means has a confining member extending over a substantial length along each side edge of the ribbon. Each member has in its inside a cavity extending along its length, and at least its part facing the side edge of the ribbon is made of porous, gas-permeable refractory material. A pressurized gas is introduced into the cavity and is blown through the porous material against the side edge of the glass ribbon, to produce a finished glass ribbon of uniform width and thickness, which thickness is greater than that thickness determined by the molten glass ribbon spreading freely on the molten metal bath under the force of surface tension.

---

This invention relates to a process for the continuous manufacture of flat glass, employing a molten metal bath, and to an apparatus suitable for use in such a process.

When manufacturing flat glass continuously by flowing molten glass from a glass melting furnace onto a molten metal bath to form a continuous glass ribbon and advancing it over the bath, the molten glass spreads out freely over the top of the molten metal and the thickness of the glass ribbon assumes a given value as a result of the phenomenon of surface tension. As a process for manufacturing a flat glass having a thickness greater than this given value, heretofore it is known to dispose at each side of the glass ribbon so as to face each other controlling means to restrict and confine the molten glass between said two means. That part of the controlling means which comes into contact with the side edges of the glass ribbon is made of a material, such as graphite or boron nitride which is not wetted by molten glass. However, when the molten glass ribbon passes between the nonwettable confining members, the edge portions of the ribbon suffer from a frictional resistance since they are contacting said confining members. Hence, the speed at which the edge portions of the molten glass ribbon advance is less than that of the middle portion of the glass ribbon, in consequence of which a flat glass of uniform thickness cannot be obtained. In the final solidified sheet, the thickness of the edge portions is less than that of the middle portion. Additionally, there is another drawback that distortions in the glass surface near the edges of the glass ribbon occur as a result of this difference in the advancing speed along the widthwise direction of the glass ribbon. These difficulties are especially pronounced in the case when relatively thick sheets are to be manufactured.

Accordingly, a primary object of the invention is to provide a process and an apparatus suitable for use in a process, which overcome these difficulties and make it possible to obtain a distortionless flat glass having a uniform thickness.

A specific object of the invention is to provide a process and an apparatus therefor by which a thick distortionless flat glass having a uniform thickness can be obtained.

A distortionless flat glass having a uniform thickness has been prepared in accordance with the invention by a process which comprises flowing molten glass from a glass melting furnace onto a molten metal bath to form a continuous glass ribbon and advancing the glass ribbon over the bath, characterized in that controlling means, whose position is adjustable, are disposed facing each other spaced apart from the inner side walls of a tank of the molten metal bath and at both sides of the molten glass ribbon which tends to spread out atop the molten metal bath, thereby confining the molten glass ribbon therebetween, at least that part of said means facing the side edge of the glass ribbon being made of porous, gas-permeable refractory material, and that a pressurized gas is introduced into the interior of each controlling means and blown out from said porous part of said means against the side edge of the molten glass ribbon, thereby preventing the adhesion of the side edge of the glass ribbon to the controlling means.

An apparatus suitable for use in the aforesaid process comprises a tank containing a molten metal bath for receiving molten glass continuously from a glass melting furnace onto the bath to form a continuous glass ribbon and means for advancing the glass ribbon over the bath, characterized in that controlling means, whose position is adjustable, are disposed facing each other spaced apart from the inner side walls of the tank and at both sides of the glass ribbon which tends to spread out atop the molten metal bath, each of said controlling means comprising (1) A confining member for confining the glass ribbon in a widthwise direction and hence controlling the thickness and width of the glass ribbon, said member extending over a substantial length along the side edge of the glass ribbon and having in the inside thereof a cavity extending along its length, at least that part of said member facing the side edge of the glass ribbon being made of porous, gas-permeable refractory material, (2) At least one conduit communicating with said cavity for introducing a pressurized gas into the cavity so as to cause the gas to be blown out from said porous part of said confining member against the side edge of the molten glass-ribbon, and (3) Supporting means for supporting said confining member.

As the aforesaid porous, gas-permeable refractory material, included are such as graphite and high alumina refractory material. Those having a porosity of 15 to 30% by volume are conveniently used.

Illustrative embodiments of the invention will now be described with reference to the accompanying drawings, in which.

Figure 1:
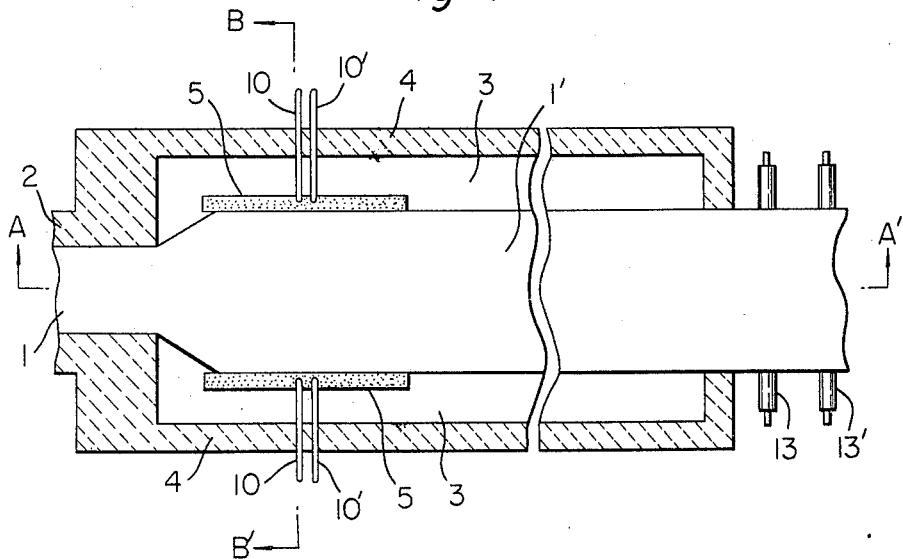
FIGURE 1 is a schematic plan view illustrating an apparatus of the invention.
Figure 2:
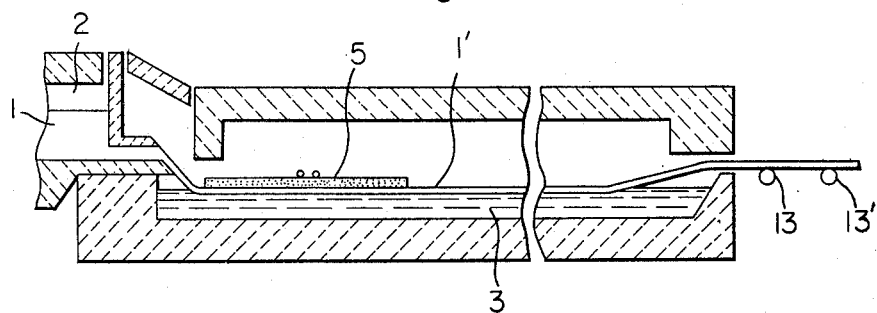
FIGURE 2 is a longitudinal section view taken along line A–A' of FIGURE 1.
Figure 3:
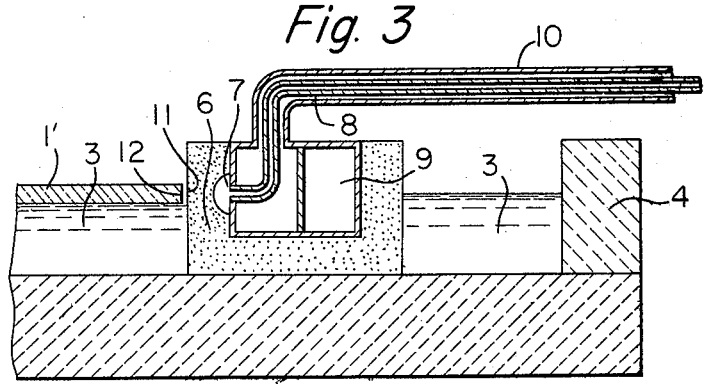
FIGURE 3 is a partial, magnified view in cross-section taken along line B–B' of FIGURE 1.

Referring to FIGURES 1 and 2, molten glass 1 flows from a forehearth 2 of a glass melting furnace (not shown) onto a molten metal bath 3 to become a glass ribbon 1′. The glass ribbon 1′ is advanced over the bath 3 by means of conveying rollers 13, 13′. At both sides of the glass ribbon 1′ which tends to spread out are disposed controlling means 5 spaced apart from the inner walls 4 of the tank, and facing each other. The molten glass ribbon 1′ is confined between the pair of controlling means 5. The construction of the controlling means 5 is illustrated in FIGURE 3. A porous, gas-permeable wall 6 made of graphite makes up the outer wall of that part of the controlling means 5 immersed in the bath 3. A cavity 7 acting as a pressure chamber is provided inside the porous wall 6 facing the side edge of the glass ribbon and extends along the length of the porous wall 6. A conduit 8 communicating with the pressure chamber 7 is provided. A gas is introduced under pressure to the pressure chamber 7 inside the porous wall 6 via the conduit 8, the gas then being blown out from a surface 11 of said wall facing the side edge 12 of the glass. As a result of this blowing, a slight clearance is set up between the surface 11 of said wall and the side edge 12 of the glass, hence preventing the adhesion of the glass edge to the surface of the controlling means.

Thus the side edges of the glass advance without being subjecting to any hindrance, resulting in the side edges and middle portion of the glass advancing at about the same speed. In consequence, a distortionless glass sheet of uniform thickness can be obtained. As the glass ribbon proceeds between the two controlling means, it is gradually cooled and by the time it has completed its passage between said controlling means it is cooled to a plastic state of an extent that it does not freely spread any more, and hence it proceeds over the rest of the bath while maintaining practically intact the width and thickness it has been imparted.

Conduits 10 and 10′ communicate with a cooling box 9 affixed to the inside wall of the porous graphite. The box 9 does not necessarily extend along the entire length of the porous wall 6. The conduit 8 is disposed in one of the conduits 10 and 10′ and opens to the pressure chamber 7 through the box 9. The conduits 10 and 10′ serve as a supporter. Water is introduced to and discharged from the box 9 by means of the conduits 10 and 10′ and serves to cool the metallic parts and, if desired, the porous wall.

The gas to be introduced into the controlling means is preferably a non-oxidizing gas, e.g., nitrogen, for preventing the oxidation of the molten metal. The pressure with which the gas is introduced will vary depending on the resistance of the porous wall to passing of gas. In the case of a porous wall having a thickness of 5 to 15 mm. and a porosity of 15 to 30% by volume, an initial pressure of 0.01 to 1 kg./cm.$^2$ will do. The rate of flow of the gas is suitably about 100 to 5000 cc. per hour per square centimeter of the surface of the porous wall.

Figure 4:
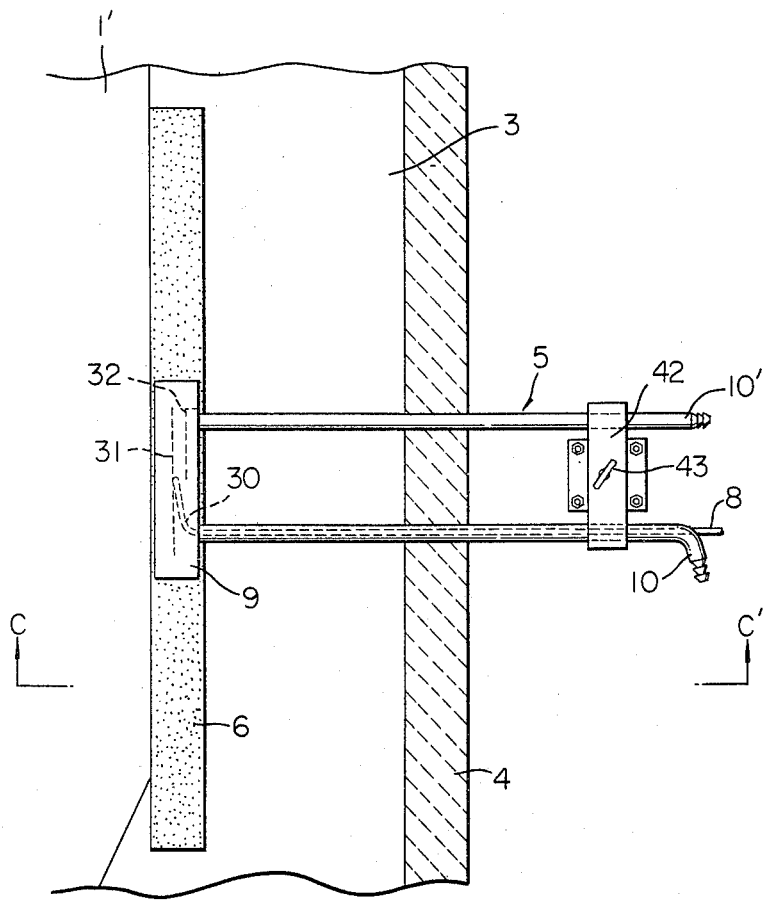
FIGURE 4 is a schematic partial plan view illustrating another embodiment of the invention.
Figure 5:
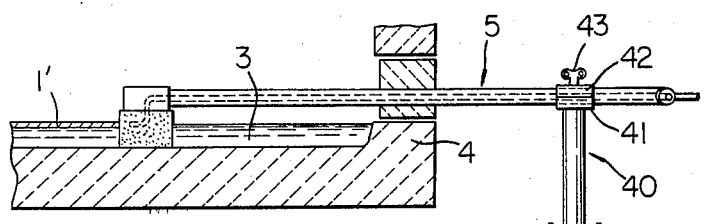
FIGURE 5 is a lateral sectional view taken along line C–C' of FIGURE 4.
Figure 6:
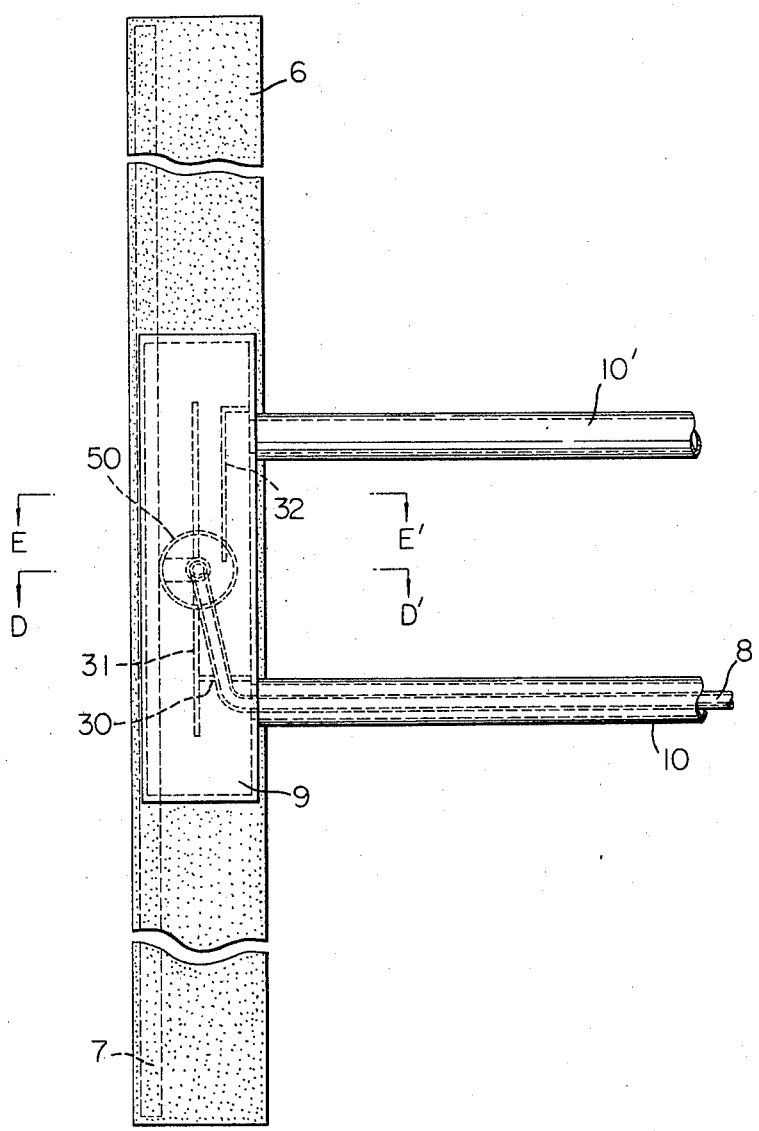
FIGURE 6 is a partial, magnified view of FIGURE 4.

The controlling means illustrated in FIGURES 4 to 9 is suitably employed in those cases where it is intended to avoid an excessive cooling of the molten metal bath. In this device, a relatively short cooling box 9 is provided atop a confining member 6 made of a porous refractory. As shown in FIGURES 4 and 5, conduits 10 and 10′ serve also as beams for supporting the controlling means 5. Means 40 for securing the conduits 10 and 10′ in a fixed position is provided fixedly at a point externally of the side wall 4 of the bath. At a prescribed height of the means 40 there are provided two members 41 and 42 between which the conduit 10 and 10′ are clamped securely by tightening a screw 43. If the screw 43 is loosened and the conduits 10 and 10′ are slidingly shifted laterally, the adjustment of the controlling means 5 to a desired position can be accomplished.

The inside of the cooling box 9 is provided with partitions 30, 31 and 32 by which a passageway is formed for the cooling water. The water entering from the conduit 10 by passing through this passageway circulates the inside of the cooling box 9 and then is discharged via the conduit 10′. The degree to which the cooling is carried out need only be of such an extent that damage caused by elevated temperatures does not occur to the gas conduit 8 and the conduits 10 and 10′ which also serve as the supporting beams. When it is desired to restrain the cooling of the molten metal still further, it is also possible to cover the top and sides of the cooling box 9 as well as the periphery of the conduits 10 and 10′ with glass cloth or other insulating materials.

Figure 7:
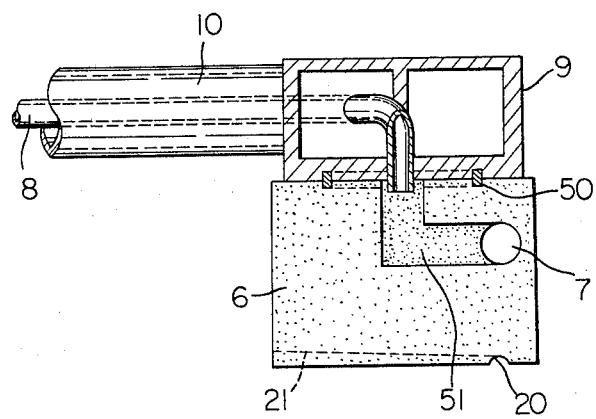
FIGURE 7 is a magnified view in cross-section taken along line D–D' of FIGURE 6.

At the boundary of the cooling box 9 and the confining member 6 of graphite, as shown in FIGURE 7, circular bandlike grooves are provided in the underside of the cooling box 9 and the top side of the confining member 6 surrounding the passage of the pressurized gas, and in these grooves which are in register with each other an O-ring 50 is fitted. The contacting surfaces of the cooling box 9 and the confining member 6 as well as the surface of the O-ring 50 are applied a sealing agent. Further, the cooling box 9 and the confining member 6 are securely fastened together by means of bolts. Hence, the pressurized gas passes through the conduit 8 and reaches the pressure chamber 7 via a hole 51 without leaking to the outside from that part where the cooling box 9 and the confining member 6 are fastened together.

Figure 8:
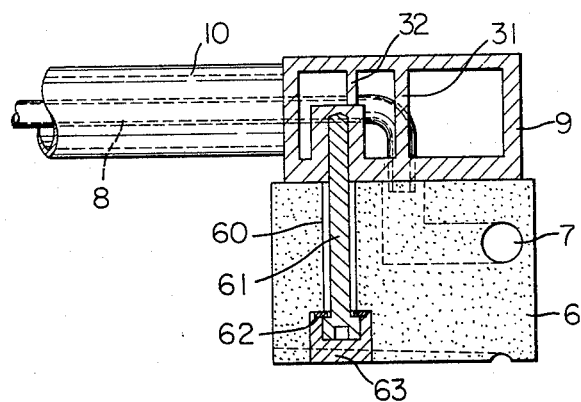
FIGURE 8 is a magnified view in cross-section taken along line E–E' of FIGURE 6.

The confining member 6, as shown in FIGURE 8, is provided with a number of vertical bores 60, through each of which passes a bolt 61 fitted with a washer 62, whereby the confining member 6 is secured to the cooling box 9. As indicated by the numeral 63 in FIGURE 8, the countersunk portion of the bore where the head of the bolt 61 comes is sealed with mortar.

Figure 9:
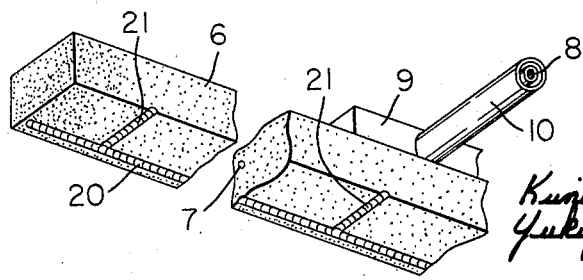
FIGURE 9 is a perspective view for showing the bottom surface of a preferred controlling means.

As illustrated in FIGURE 9, at the underside of the confining member 6 there is provided a channel 20 alongside that edge near the glass ribbon. Further, a plurality of channels 21 are provided at intervals extending from the channel 20 to that side of the confining member opposite to that in promixity to the glass ribbon, the depth of these channels gradually becoming deeper as they proceed to the opposite side. The bubbles of gas which result from the gas being emitted from the underside of the confining member and gradually accumulate thereat proceed via the channels 20 and 21 and rise to the surface of the molten metal bath at the outer side thereof. Hence, the defects in the glass due to the bubbles rising to the surface of the bath to splash the molten metal upwards and cause small particles of the metal to fall onto the top of the glass ribbon is prevented by the provision of these channels.

Aside from providing gas venting channels, as hereinabove described, for preventing bubbles rising from the underside of the confining member to the inner side of the metal bath, it is possible to slope the underside of the confining member in such a fashion that the outer side is at a higher level than the inner side or to use at the underside of the confining member graphite not possessing gas permeability or other refractory material which are gas impermeable.

The maintenance of the feed of the molten glass onto the molten bath at a constant amount is desirable from the standpoint of the operation of the glass melting furnace. Since according to this invention the position of the controlling means can be freely varied, molten glass can be accumulated between the two controlling means in an amount sufficient to make a glass sheet of the desired thickness by varying the distance between the controlling means, while maintaining the feed of the molten glass onto the molten metal bath at a constant rate. Needless to say, a glass ribbon of a desired thickness and width can be obtained by adjusting the distance between the controlling means can be freely varied, molten glass onto the molten metal bath. Now, the friction between the two controlling means and the side edges of the molten glass ribbon held between said cotrolling means is practically zero due to the presence therebetween of a gaseous film. Therefore, it has become possible according to this invention to stably manufacture a distortionless glass of a desired thickness whose thickness is uniform, and furthermore those of a thickness on the order of 8 mm. to 15 mm., or even thicker, whose manufacture was difficult in the past.

We claim:

1. A process for the manufacture of flat glass which comprises the steps of:
   (a) feeding molten glass continuously from a glass melting furnace onto a bath of molten metal;
   (b) advancing the glass in the form of a continuous ribbon over the bath;
   (c) confining the glass ribbon, which is likely to freely spread laterally, between the surfaces of a pair of adjustable controlling members oppositely facing each other and at least partially within said bath on both side edges of the glass ribbon by adjusting the distance between both of said controlling member surfaces, being kept narrower than the width which would be had by the glass ribbon, if it were allowed to freely spread, and with at least that part of said controlling member surface facing the side edge of the glass ribbon being porous gas-permeable refractory material;
   (d) blowing a pressurized non-oxidizing gas at a predetermined pressure and a predetermined rate laterally inward against each side edge of the advancing ribbon through said gas-permeable porous refractory material to maintain a thin gaseous film between the surface of the porous refractory material and the side edge of the glass ribbon, thereby preventing the adhesion of the side edge of the glass ribbon to the controlling members; and thereby obtaining the finished glass ribbon having a predetermined uniform width and a predetermined uniform thickness, which thickness is greater than that thickness determined by the molten glass ribbon spreading freely on said bath under the force of surface tension.

2. The process as defined in claim 1 comprising the further step of forcing said gaseous film to ascend and to mix with said atmospheric gas laterally of said controlling members and on the side opposite that of said glass sheet being formed to preclude imperfections being formed in said glass.

3. The process as defined in claim 1 wherein the porous refractory material is porous graphite.

4. The process as defined in claim 1 wherein the porous refractory material is a high alumina refractory.

5. The process a defined in claim 1 wherein the pressurized non-oxidizing gas is blown from the surface of the porous refractory material at a rate of about 100–5000 cc./hr. per square centimeter of said surface.

6. The process as defined in claim 1 wherein the pressurized non-oxidizing gas is blown at an initial pressure of from 0.01 to 1 kg./cm.$^2$, and passes from the surface of the porous refractory material at a rate of about 100–5000 cc./hr. per square centimeter of said surface.

7. The process as defined in claim 1 further utilizing a porous refractory material having a thickness of between approximately 5–15 mm., a porosity of approximately 15–30% by volume, and introducing the said gas at a rate of approximately from .01 to 1 kg./cm.$^2$ and at a rate of from approximately 100 to 5000 cc./hr. per square centimeter of said surface.

8. The process as defined in claim 1 further comprising the step of covering said molten metal bath with a non-oxidizing atmospheric gas to prevent the oxidization of the molten metal, and further positioning said bath controlling member surfaces parallel to each other along the length of the bath.

9. An apparatus for manufacturing flat glass of uniform thickness and width, comprising an elongated bath of molten metal for receiving a continuous ribbon of molten glass from a glass furnace; a molten glass feeding means at an input end of said elongated bath between the bath and the furnace for feeding a ribbon of glass onto said molten bath; adjustable gas-permeable porous refractory members disposed at least partly within said bath extending along at least the part of the length of each side of said molten metal bath near to said feeding means for confining the glass ribbon therebetween and having a vertical dimension at least as great as the thickness of the glass; gas pressure supply means connected to said refractory members for supplying non-oxidizing pressurized gas to said members so that the gas is jetted through the refractory members against the side edges of the glass ribbon on the molten metal bath to keep the molten glass spaced from the said refractory members; and supporting means connected to said refractory members for supporting said refractory members and means for adjusting the position of said refractory members thus controlling the distance between said refractory members, thereby obtaining the finished glass ribbon having a predetermined uniform width and a predetermined uniform thickness, which thickness is greater than that thickness determined by the molten glass ribbon spreading freely on said bath under the force of surface tension.

10. An apparatus as claimed in claim 9 in which said refractory members are hollow, and said gas pressure supplying means comprise conduits extending through said refractory members into the hollow interior thereof.

11. An apparatus as claimed in claim 10 in which each of said refractory members comprises an underside surface positioned within said bath, said underside being provided with a first channel alongside the glass ribbon, and being further provided with a plurality of second channels at intervals extending from said first channel to the opposite side of said refractory member, the depth of said second channels gradually becoming deeper as they proceed to said opposite side, thereby directing the gas jetted from the underside to rise at said opposite side to preclude imperfections from being formed on the lower face of said glass ribbon.

12. An apparatus as claimed in claim 9 further comprising hollow cooling members extending along at least some of the surfaces of said refractory members other than the surfaces facing said molten metal bath, and said supporting means comprises cooling fluid circulating means coupled to said cooling members for circulating cooling fluid to cool said refractory members.

13. An apparatus as claimed in claim 12 in which said cooling fluid circulating means comprises a plurality of pipes at least two of which are connected to said hollow cooling members fastened to said refractory members, thereby causing the cooling fluid to pass through at least one pipe, to circulate in said hollow cooling members and to be discharged through at least the other pipe.

14. An apparatus as claimed in claim 13 in which said gas pressure supplying means comprises a conduit passing through the interior of at least one of said pipes of said cooling fluid circulating means and connecting to said refractory members.

References Cited

UNITED STATES PATENTS

| | | |
|---|---|---|
| 2,387,886 | 10/1945 | Devol. |
| 2,444,731 | 7/1948 | Devol. |
| 2,478,090 | 8/1949 | Devol. |
| 2,505,103 | 4/1950 | Devol. |
| 3,266,880 | 8/1966 | Pilkington _____ 65—182 |
| 3,353,943 | 11/1967 | Loutte. |

S. LEON BASHORE, Primary Examiner

E. R. FREEDMAN, Assistant Examiner

U.S. Cl. X.R.

65—99, 65, 169, 182